United States Patent
Ren et al.

(10) Patent No.: US 6,296,964 B1
(45) Date of Patent: Oct. 2, 2001

(54) ENHANCED METHANOL UTILIZATION IN DIRECT METHANOL FUEL CELL

(75) Inventors: Xiaoming Ren; Shimshon Gottesfeld, both of Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/472,387

(22) Filed: Dec. 23, 1999

(51) Int. Cl.[7] .................................................... H01M 8/02
(52) U.S. Cl. ............................................................. 429/38
(58) Field of Search ................................ 429/12, 14, 34, 429/38, 39

(56) References Cited

U.S. PATENT DOCUMENTS

| | | | |
|---|---|---|---|
| 4,769,296 | * 9/1988 | Sterzel | 429/12 |
| 5,672,439 | 9/1997 | Wilkinson et al. | 429/40 |
| 5,776,624 | * 7/1998 | Neutzler | 429/26 |
| 5,789,093 | * 8/1998 | Malhi | 429/34 |
| 5,958,616 | * 9/1999 | Salinas et al. | 429/41 |
| 5,976,726 | * 11/1999 | Wilkinson et al. | 429/35 |

* cited by examiner

Primary Examiner—Gabrielle Brouillette
Assistant Examiner—M. Wills
(74) Attorney, Agent, or Firm—Ray G. Wilson (57) ABSTRACT

The fuel utilization of a direct methanol fuel cell is enhanced for improved cell efficiency. Distribution plates at the anode and cathode of the fuel cell are configured to distribute reactants vertically and laterally uniformly over a catalyzed membrane surface of the fuel cell. A conductive sheet between the anode distribution plate and the anodic membrane surface forms a mass transport barrier to the methanol fuel that is large relative to a mass transport barrier for a gaseous hydrogen fuel cell. In a preferred embodiment, the distribution plate is a perforated corrugated sheet. The mass transport barrier may be conveniently increased by increasing the thickness of an anode conductive sheet adjacent the membrane surface of the fuel cell.

8 Claims, 10 Drawing Sheets

FIGURE 10 and# ENHANCED METHANOL UTILIZATION IN DIRECT METHANOL FUEL CELL

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to polymer electrolyte membrane fuel cells, and, more particularly, to fuel cells using methanol as a direct fuel supply.

BACKGROUND OF THE INVENTION

Fuel cells are emerging devices for generating electrical energy primarily by converting hydrogen to water as the only reaction product. However, the availability of pure hydrogen as a fuel source is a significant limitation on uses of fuel cells since there is no present infrastructure for making hydrogen widely available. Consequently, fuel cells are being developed to directly use readily available and easily transportable fuels, such as methanol. The development of compact, portable devices powered by direct methanol fuel cells (DMFCs) requires a capability to efficiently use methanol fuel directly.

With polymer electrolyte membranes that are currently available, e.g., Nafion®, there is significant methanol permeation through the membrane from the cell anode to the cathode. Excessive methanol permeation at typical rates equivalent to 100–200 mA/cm$^2$ presents a major problem in direct methanol fuel cell (DMFC) systems. Such methanol "crossover" corresponds to severe fuel loss because each methanol molecule that crosses through the membrane to the cathode recombines directly with oxygen at the air cathode without producing electrical energy. Fuel utilization is defined by the ratio:

(cell current)/[(cell current)+(crossover current)]. At a crossover rate of 100–200 mA/cm$^2$, fuel utilization of a DMFC would be as low as 50% at typical fuel cell operating conditions. As a comparison, a fuel utilization rate of around 99% has been achieved in hydrogen/air fuel cells, where gaseous hydrogen has a much lower permeability through the membrane.

The methanol permeate usually combines readily with oxygen (air) on Pt catalyst at the cathode to form water and carbon dioxide. This process likely occurs through the short circuit of methanol electrooxidation and oxygen electroreduction reactions. The oxygen cathode is thus further depolarized when consuming the methanol permeate and additional cathode losses result.

Furthermore, any unreacted methanol at the cell cathode adversely affects the oxygen reduction process: the methanol can wet the cathode structure, causing the cathode catalyst to be deactivated and the cathode backing to be flooded and become inaccessible to oxygen in the cathode feed stream. These adverse effects of methanol crossover are even more profound when a limited airflow at ambient air pressure has to be used to obtain the simplicity and light weight of a portable direct methanol fuel cell power device.

Methanol crossover rates can be reduced, in principle, by lowering the methanol feed rate. But such a reduction in methanol feed rate can result in maldistribution of methanol flow over the active surface area of the membrane, with concomitant mal-distribution of current density, particularly when conventional flow channel designs are used. Consequently, the anode feed flow rates typically employed are sufficient to limit the methanol concentration drop between the cell inlet and outlet to only 30%. One aspect of the present invention provides a uniform distribution of methanol over the active surface of the membrane.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The fuel utilization of a direct methanol fuel cell is enhanced in accordance with the present invention. Distribution plates at an anode and cathode of the fuel cell are configured to laterally distribute reactants uniformly over catalyzed membrane surfaces of the fuel cell. A conductive anode backing sheet between the anode distribution plate and the membrane surface forms a mass transport barrier to the methanol fuel that generates under electrical current conditions a methanol concentration drop across the backing to minimize methanol permeation through the membrane. In a preferred embodiment, the distribution plate is a perforated corrugated sheet. The mass transport barrier may be conveniently increased by increasing the thickness and controlling the porosity of an anode conductive sheet adjacent the membrane surface of the fuel cell.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

A direct methanol fuel cell stack is normally operated with an aqueous methanol solution feed at the anode of each unit cell and ambient or pressurized air feed at the cathode of each unit cell. Flow channel devices serve to direct the methanol solution and the air over backing plates that contact opposed faces of a polymer electrolyte membrane that conducts ions to complete a circuit for current flow. Effective flow channel devices serve to uniformly distribute the appropriate reactant over a face of the associated backing plate with a small pressure drop across the flow channel device.

In one embodiment of the present invention, a novel flow field is provided as described in a co-pending U.S. Patent Application (S-91,719), Flow Channel Device for Electrochemical Cells, filed concurrently herewith by the inventors herein, and incorporated by reference. The flow channel design described therein provides flow channels with perforations that permit the reactant flow to laterally redistribute between channels, particularly where a channel flow is restricted by liquid accumulation, to maintain a uniform flow over the backing plates.

Figure 1A:
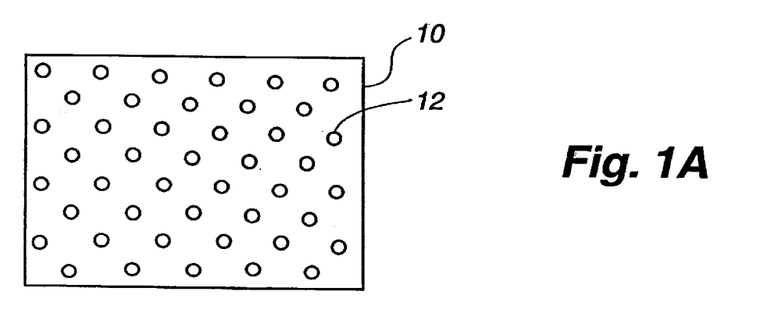
FIGS. 1A and 1B illustrate the fabrication of flow field plate according to one aspect of the present invention.
Figure 1B:
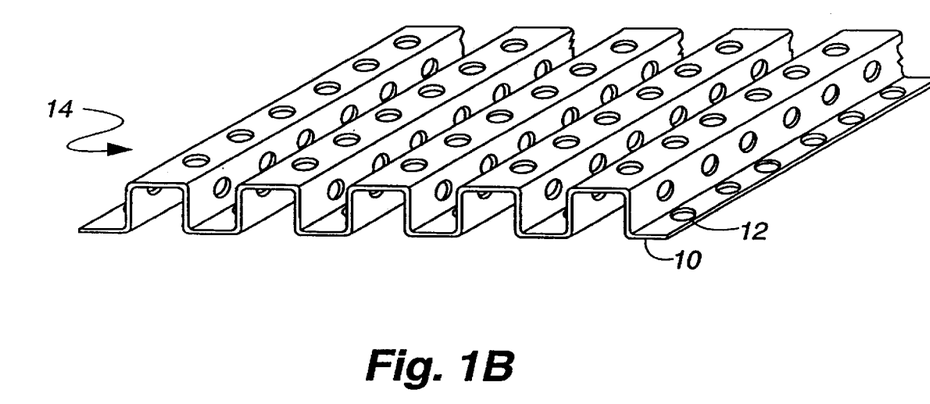

Referring first to FIGS. 1A and 1B, a flow field device 14 is formed from a plate 10 having perforations 12. Perforations 12 are preferably in a staggered arrangement to maintain structural integrity of plate 10, but many variations of perforations can be provided.

To form a flow distribution device 14, perforated plate 10 is corrugated, as shown in FIG. 1B, i.e., plate 10 is formed into a configuration having folds of alternating ridges and valleys. The contour of the corrugations may be smoothly varying, e.g., sinusoidal, or be substantially square, e.g., with flat ridges and valleys, or triangular. The contact resistance between the ridges and valleys and adjacent conductive surfaces will determine what configurations are acceptable in any given design. In a preferred embodiment, flow distribution device 14 is formed with substantially square corrugations having a spacing effective to place perforations in a manner that permits transverse flow distribution along corrugated plate 14 and longitudinal flow through the lands that form the ridges and valleys.

In an experimental, non-optimized embodiment, the perforations accounted for up to 50% of the area of sheet 10. Optimization of flow distribution device 14 for any given application will involve the size and distribution of the perforations and the configuration of the corrugations. To minimize contact resistance with adjacent cell components, the sheets were 4 mil thick stainless steel that was electrochemically plated with a 200 nm thick gold layer. Acceptable resistance is also obtained from perforated sheets of stainless steel alloys of the 300 and 400 series when a high compression axial loading is applied to the cell. Other conductive metals may be found to be useful by routine testing with such materials and are within the scope of this invention.

Figure 2:
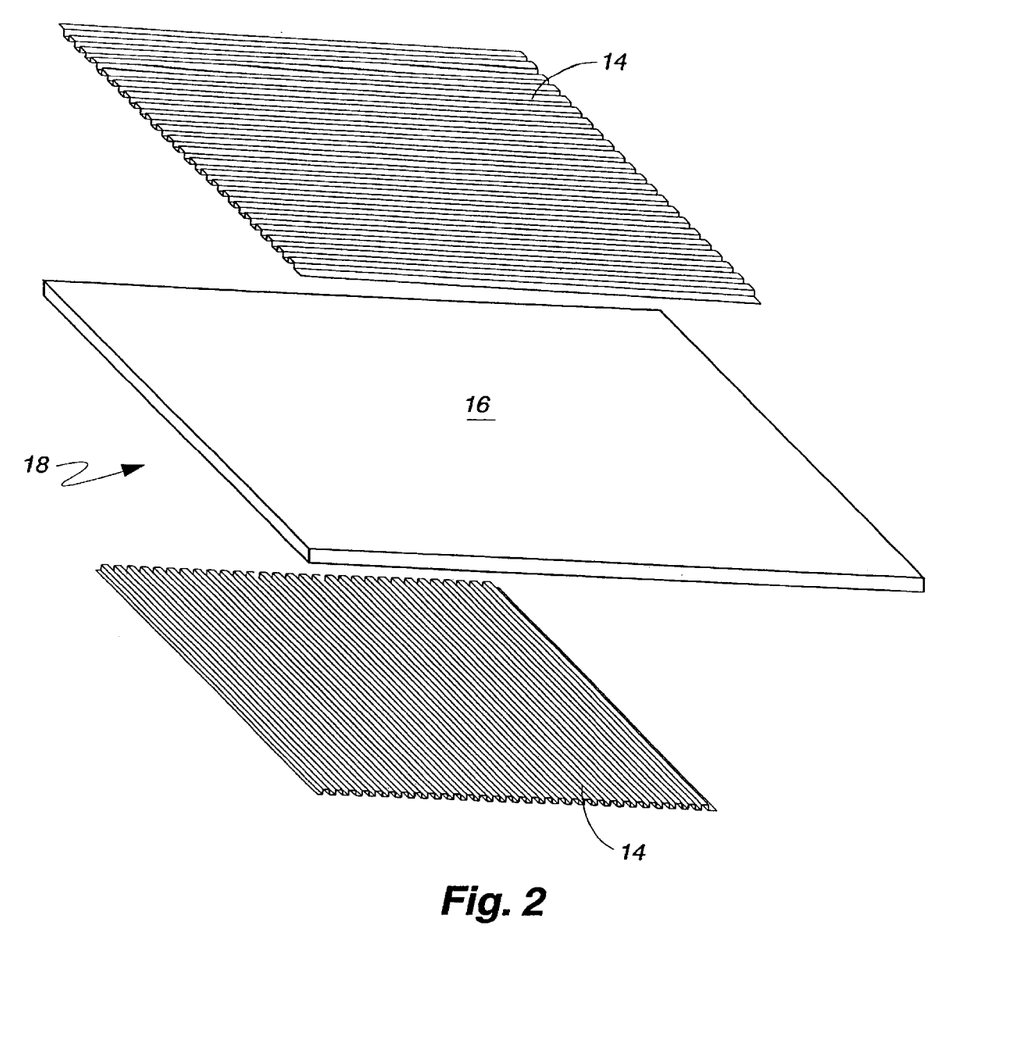
FIG. 2 is an exploded view of a bipolar plate assembly according to one embodiment of the present invention.

For fuel cell stacks, bipolar plates were formed with flow channels defined by corrugated sheets 14 on both sides of electrically conductive flat sheet 16, as shown in FIG. 2. Conductive sheet 16 can be formed from any of a number of materials used in fuel cells, such as carbon, stainless steels, and the like.

The preferred embodiment, discussed below, incorporates bipolar plate with corrugated sheets 14 on both sides of conductive sheet 16. Suitable bipolar plates can also be formed with a corrugated sheet 14 on only the cathode side of a conductive plate where a gas/liquid flow must be accommodated. A conventional sepentine or wire mesh flow field (e.g., U.S. Pat. No. 5,798,187, issued Aug. 25, 1998, incorporated herein by reference) can be provided on the anode side of the cell.

Figure 3:
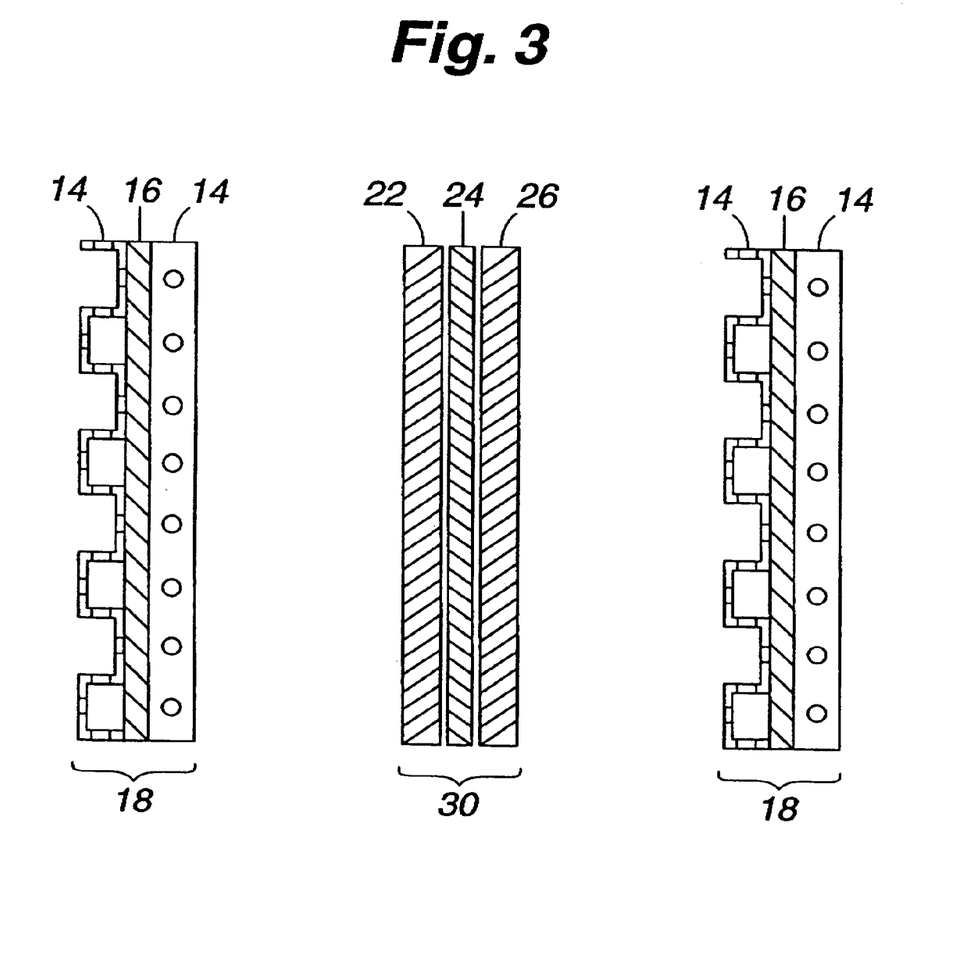
FIG. 3 is a cross-sectional view of a fuel cell assembly using the bipolar plates shown in FIG. 1.
Figure 4:
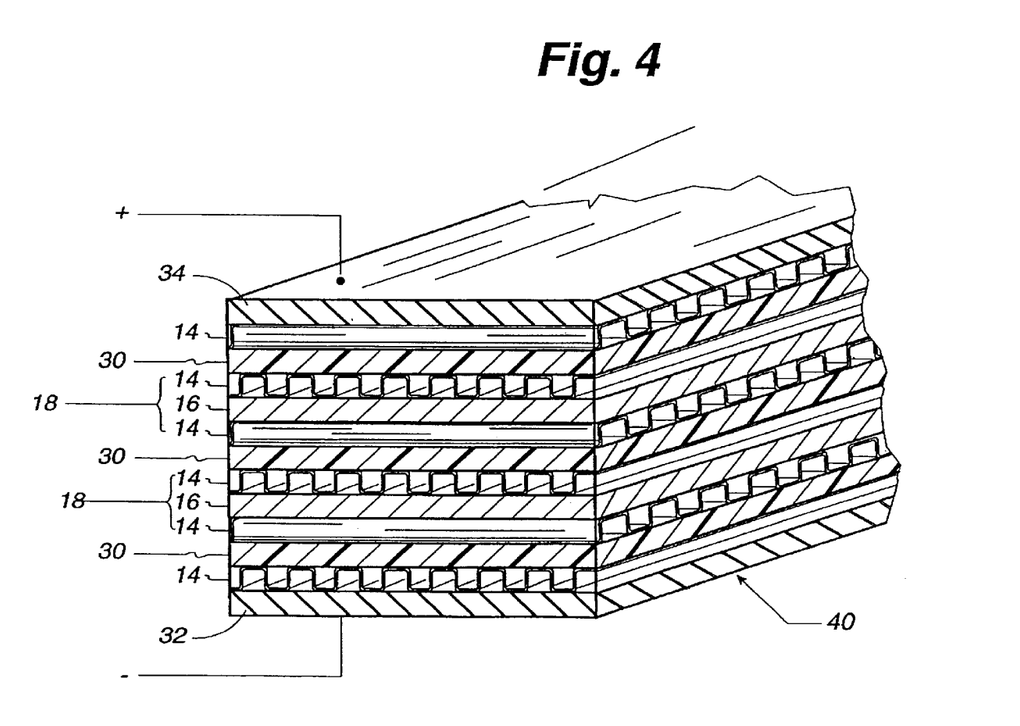
FIG. 4 is an isometric cross-sectional view of a fuel cell stack using fuel cells shown in FIG. 3.

FIGS. 3 and 4 generically depict a fuel cell assembly and a cell stack and illustrate the context for utilizing the benefits of the present invention. FIG. 3 is an exploded view, in cross-section, of a fuel cell assembly. Membrane electrode assembly 30 is formed from a proton conducting membrane 24, which is preferably a polymer electrolyte, that is placed between anode 22 and cathode 26. Membrane electrode assembly 30 is placed between conductive corrugated sheets 14, which supply various fluids across the face of electrodes 22 and 26 through flow field passages defined by the corrugations.

Perforations, e.g., perforations 12 in corrugated sheet 14 (FIGS. 1A and 1B), permit fluid interchange and lateral mixing between flow channels in order to evenly distribute fluid flow over the surface of the electrodes, e.g., electrodes 22, 26. An even distribution of fluid flow enhances an even humidification of membrane 24 and the removal of reaction water from along the cathode surface to enhance uniform reactant gas access to the electrode and membrane surface. Perforations 12 also permit fluids within the flow channels to contact the surfaces of electrodes 22, 26 through the corrugated sheets 14 to provide a larger surface area for increased reactant utilization and removal of reaction products.

In many stack designs, cooling plates are periodically interspersed between the fuel cell assemblies. Instead of a reactant, coolant is distributed in some manner across the plate. Since the cooling plates basically need to satisfy the same requirements as the bipolar plates (e.g., conductivity, strength, flow distribution, etc.) and may be configured such that one side distributes coolant and the other side a reactant, etc., such components will also be considered under the general term "bipolar plates".

In FIG. 4, a plurality of membrane electrode assemblies 30 are placed alternately in series with bipolar plates 18, which serve to electrically connect in series anodes 22 and cathodes 26 of adjacent cells (see FIG. 3 for fuel cell assembly references) to form fuel cell stack 40. End plates 32 and 34 contact end ones of corrugated flow devices 14 and are loaded to compress the stack of bipolar plates 18 and membrane electrode assemblies 30 between end plates 32 and 34

Membrane electrode assemblies 30 are formed according to the particular fuel cell application. Anode 22 is typically a carbon cloth material formed to provide methanol permeation characteristics as discussed below. Cathode 26 is a conventional carbon cloth material, such as E-tek NC/DSN2 backing that includes polytetrafluoroethylene (PTFE) to provide hydrophobicity and maintain part of the porous network liquid free.

Membrane 24 is formed from a polymer proton conducting material, such as Nafion® 117. Membrane 24 has catalytic surfaces selected for the anode and cathode reactions in accordance with the fuel cell performance requirements. The catalytic surfaces may be formed as described in U.S. Pat. Nos. 5,234,777 and 5,211,984 where supported catalysts are desired.

Alternatively, unsupported catalysts may be incorporated by painting an anode ink and a cathode ink on the respective membrane surfaces. Exemplary inks have been prepared by dispersing PtRu and Pt in a 1200 equivalent weight (EW). Nafion® solution with 15 w % and 10 w % Nafion® binder, respectively. The ink is painted on the membrane surfaces with the membrane held to a vacuum table at about 60° C. The low operating current density in DMFCs may permit other membranes to used that have less methanol permeation, even if somewhat more resistive. Such membranes may be formed from Nafion® and similar membranes of higher EW and significant thickness ($\geq$7 mil) and various composite membranes of reduced porosity.

Both single cell and stacked fuel cell configurations in accordance with FIGS. 3 and 4 have been constructed and tested. As discussed below, a five-cell fuel cell stack with liquid anode feed (1 M methanol (MeOH)) showed very good performance, even with low stoichiometric ambient air flow (3× oxygen electrochemical consumption rate) at the test elevation (0.76 atm). The performance was achieved with a very low pressure drop of 1" of water across the stack for both air and methanol solutions and with a compact packaging of 2 mm per cell. These results signify an enhanced power density with low parasitic power losses from air pressure drops enabled by the flow field device of the present invention.

Test fuel cells were formed from membrane/electrode assemblies prepared using a 45 cm² Nafion 117 membrane catalyzed with PtRu at 8 mg/cm² on the anode side and 6 mg/cm² on the cathode side. The anode feed was 1 M MeOH aqueous solution at 2 cc/min and the cathode feed was 0.76 atm air at 314 standard cc/min Initial tests showed that performance was substantially reproducible between the five cells and was relatively constant down to air stoichiometry as low as two. In an extended test up to 2000 hours, the stack demonstrated a high efficiency of air distribution along the active cathode area by the corrugated/perforated configuration in spite of a high liquid water content at the cathode.

Figure 5:
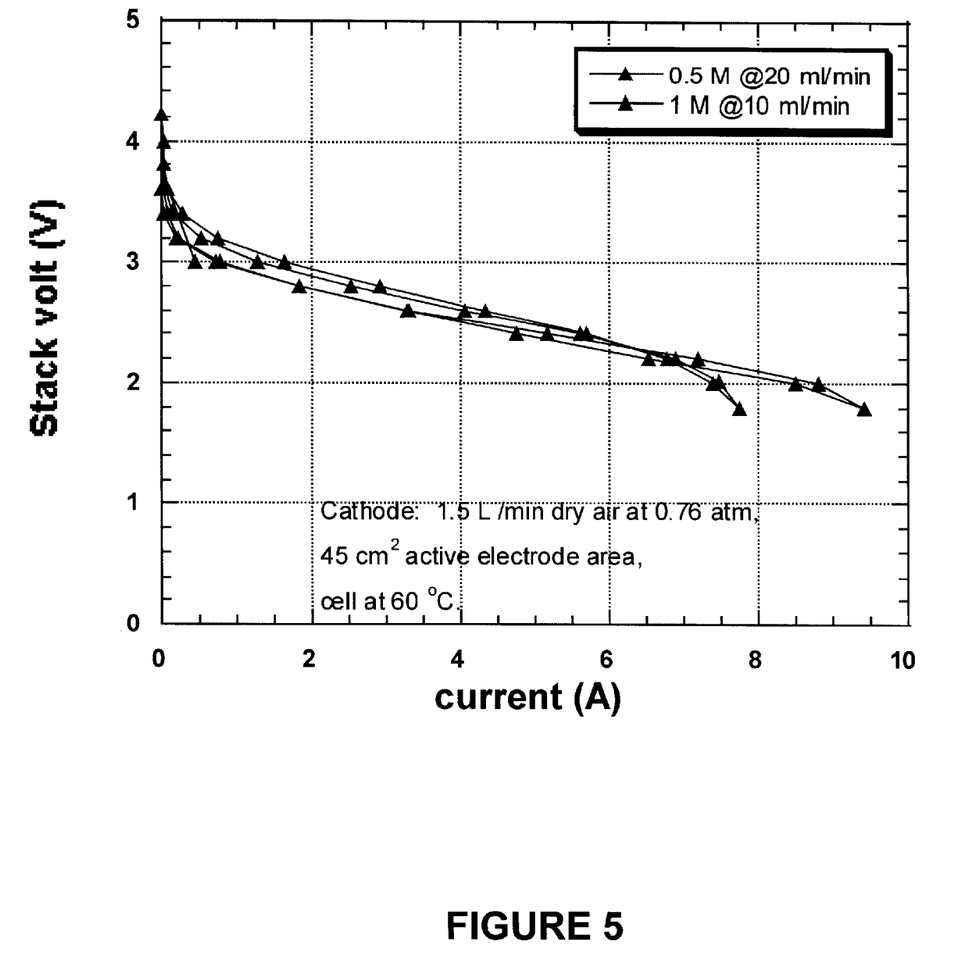
FIG. 5 graphically depicts performance of a 5-cell direct methanol/air stack with an active area of 45 cm$^2$ at 60° C.

FIG. 5 shows a 5-cell stack performance at 60° C. with 0.5 and 1.0 M MeOH feeds at the anode. The single sided E-Tek carbon cloth backing (E-Tek 2.22) used here has a limiting current of methanol permeation of 200 and 400 mA/cm² with 0.5 and 1.0 M MeOH feeds, respectively. At the design point of 0.45 Volt/cell, the stack generated a similar current of 7 A, or 155 mA/cm² in current density, with 0.5 and 1.0 M MeOH feeds. The methanol crossover rate was 15 mA/cm² and 50 mA/cm² with 0.5 and 1.0 M MeOH feeds, respectively. Crossover rates were determined from complete methanol mass balance and cell charge. The stack fuel efficiency is thus 91% and 76% with 0.5 and 1.0 M methanol feeds, respectively.

Figure 6:
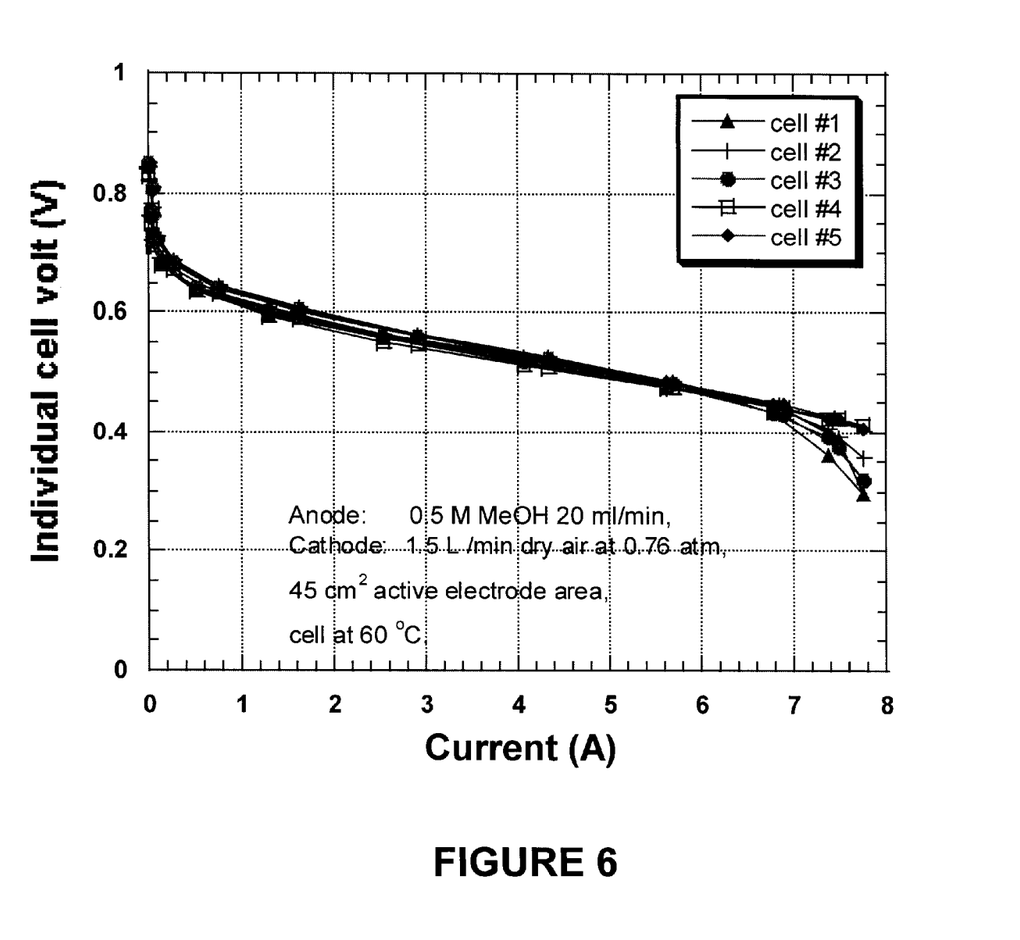
FIG. 6 graphically depicts individual cell performance from the 5-cell stack shown in FIG. 5.

The individual cell performance within the 5-cell stack fed with 0.5 M MeOH solution is shown in FIG. 6. A uniform methanol distribution between the cells within this stack was maintained at a stack current up to 7 A. At a higher current demand corresponding to methanol feed stoichiometry <3, some cells in the stack experienced larger cell voltage decrease than others because of non-uniform methanol distribution between the cells at the fixed methanol feed rate employed, but such poor methanol distribution between the cells can be eliminated, in principle, by using a sufficiently high methanol flow rate to the stack.

At a stack current of 7 A, the appropriate combination of the anode backing thickness and porosity and 0.5 M Methanol feed yielded a high methanol fuel utilization of 91% without performance loss arising from poor methanol distribution between cells or any other methanol transport limitation. In this case, by using the unique open structured flow fields according to one aspect of the present invention, the design current can be as high as 78% of the limiting current of methanol across the suitable anode backing, thus ensuring a high fuel utilization.

The appropriate choice of an anode backing is made based on the current density at the design point for cell operation, $J_{cell}$, the anode inlet methanol feed concentration and flow rate and the target fuel efficiency. As a rule, the fuel efficiency is to be maximized. According to this invention, a thicker and/or less porous anode backing layer is chosen to lower methanol permeability. Such an anode backing will present an increased barrier to methanol transport, resulting in lowering the methanol crossover rate as methanol is consumed in the DMFC process, i.e., the crossover rate will be lowered with increased fuel cell current.

As DMFC current is drawn, i.e., as methanol is consumed at the anode catalyst, the flux of methanol to the membrane will be limited by a properly chosen anode backing layer, and, consequently, methanol concentration at the backing/membrane interface drops below the methanol feed concentration. This results in a lower flux of methanol across the membrane, i.e., lower rate of crossover. Fortunately, such a drop in methanol concentration at the catalyzed membrane surface does not reduce the rate of the anodic process, because this catalytic process is "zero-order" in methanol concentration, i.e., the reaction does not depend on methanol concentration at the catalyst surface for a wide range of methanol concentrations, e.g., a range of 0.1M to 1.0M.

Figure 7:
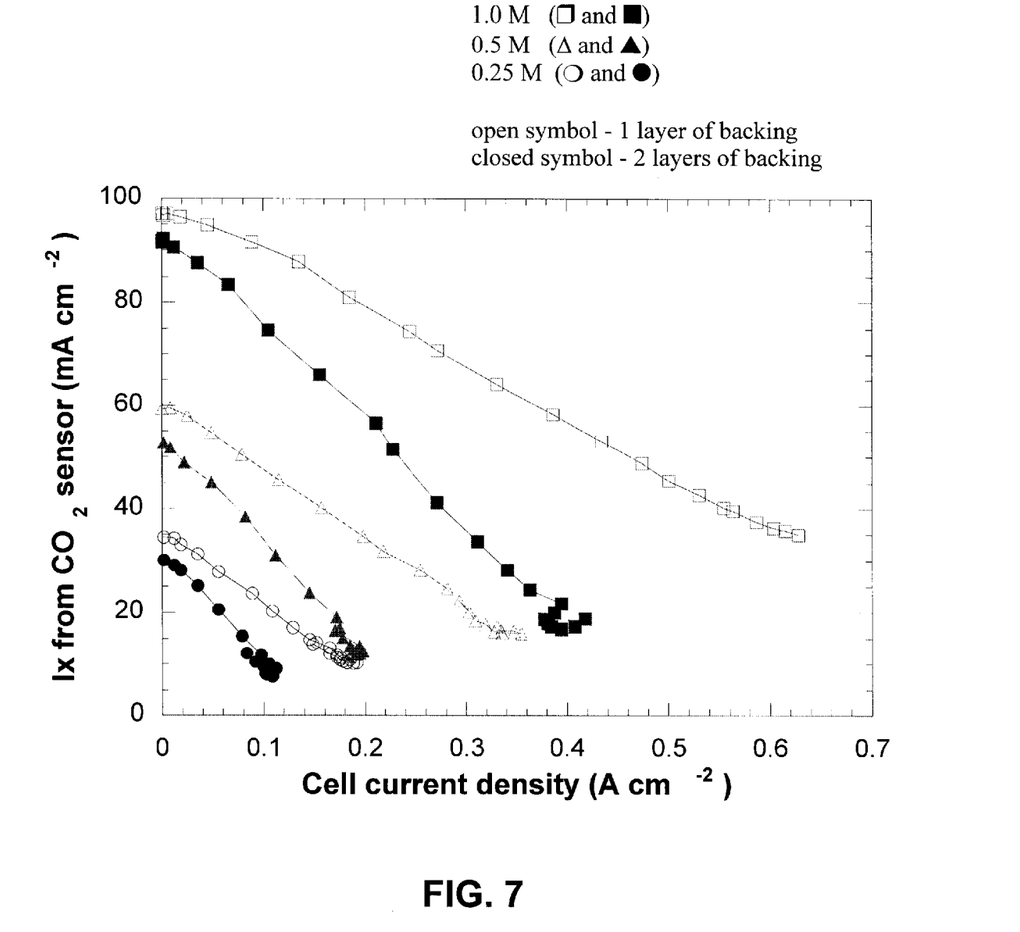
FIG. 7 graphically depicts $CO_2$ generated at the DMFC cathode as a measure of methanol crossover rate as a function of cell current for different methanol feed concentration and anode backing thickness.

FIG. 7 shows that, given a methanol feed concentration, the extent to which the rate of methanol crossover drops with increasing DMFC current is controlled by the properties of the anode backing. The data were taken at methanol solution feed concentrations of 1 M, 0.5 M, and 0.25 M, each with 1 layer and 2 layer anode backings of carbon cloth (E-TEK, NC/DS/V2). A Nafion® membrane was used in the cell.

According to this invention, a DMFC anode backing is chosen so as to achieve the strongest drop of methanol crossover with DMFC current, provided the limiting rate of methanol flux through the backing, $J_{lim, b}$, is still larger than the maximum design current, $J_{cell}$. As demonstrated below, under conditions where $J_{lim,b}$ is just 10–20% larger than the design current density $J_{cell}$, a strong drop in methanol crossover can be obtained at $J_{cell}$ as a result of the strong concentration drop across the anode backing. With an effective perforated/corrugated metal flow field, as described in this invention, $J_{lim, b}$ can be limited to around 1.2 $J_{cell}$ while maintaining good current distribution at $J_{cell}$, both laterally over each electrode and between different cells in a stack.

$J_{lim,b}$ for a given anode backing layer is easily recognized: in a DMFC polarization measurement, it is the cell current at which the voltage starts dropping sharply with further current increase. Further verification that such "limiting current" behavior of the cell originates from the anode, rather than from an ill-designed air cathode, can be verified by testing linearity of the cell limiting current with methanol feed concentration, and/or by testing the DMFC with cathode fed by neat oxygen.

Figure 8:
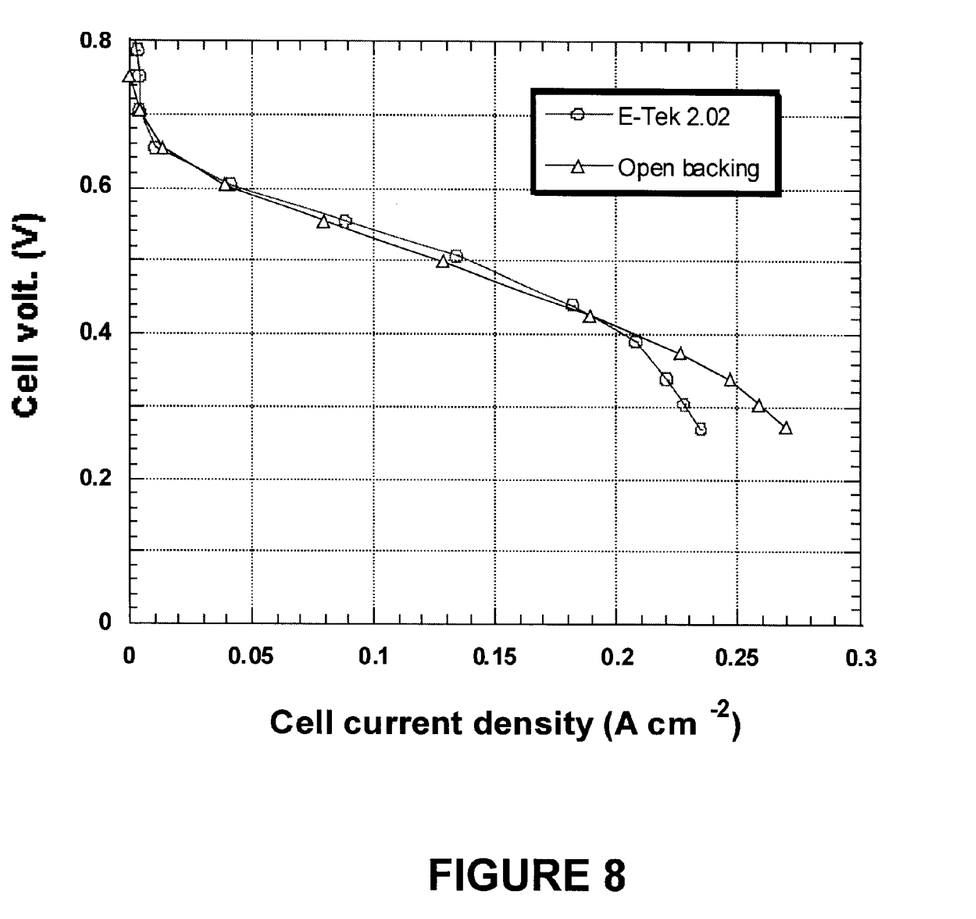
FIG. 8 graphically depicts direct methanol fuel cell performance at 60° C. with 0.5 M methanol feed solution at 5 mL/min at the anode and 315 sccm air at 0.76 atm at the cathode with two different anode backings.

Alternatively, direct measurement of $J_{lim,b}$ can be performed in a cell where the methanol anode is complemented by a hydrogen-evolving cathode, where the cathode now serves as a counter electrode and a reference electrode. As seen in FIG. 8, the anode controlled cell current clearly shows a plateau corresponding to $J_{lim,b}$.

According to this invention, the anode backing can be selected from preparations based on carbon cloth (or carbon paper) of various thickness, filled to different degrees with PTFE-bonded carbon powder, targeting the condition $J_{lim,b}$=1.2±0.1 $J_{cell}$, where $J_{cell}$ represents an operation design point. This condition can be fulfilled, in principle, by several combinations of methanol feed concentration and physical parameters of a backing layer (thickness and porosity) and, thus, it can apply for a variety of anode feed management designs that may rely on different methanol feed concentrations.

Single cells with different anode backings were also studied to compare the cell performance and fuel utilization in relation to the limiting methanol current across the anode backing used. FIG. 8 shows the performance of two cells with two types of anode backing, the hydrophilic single sided E-Tek carbon cloth backing (E-Tek 2.02) and open backing (i.e., carbon cloth without carbon loading), tested at 60° C. with 0.5 M methanol solution feed at 5 mL/min. The limiting methanol current densities across the two anode backings were 240 and 300 mA/cm$^2$, respectively. At a cell current density up to 190 mA/cm$^2$, the cell with E-Tek 2.02 anode backing had better performance than the cell with the open backing that permits a higher methanol flux across the backing. At 190 mA/cm$^2$ the methanol crossover current of the two cells with E-Tek 2.02 and open backings are 16 and 28 mA/cm$^2$, respectively. The corresponding fuel efficiencies at the DMFC current density of 190 mA/cm$^2$ for these two cells were 93 and 88%, respectively. In both cells, the voltage decreased more rapidly at a cell current density higher than about 80% of the limiting methanol current density across the anode backing.

In summary, a suitable anode backing can be selected based on its limiting methanol current and the DMFC current density at the design point. From both single cell and stack studies, the DMFC operating current density can reach up to 80% of the limiting current of methanol across the anode backing, in order to reach a high methanol fuel utilization without performance loss arising from poor methanol distribution between the cells and methanol transport limitation across the anode backing. By operating the cell at a current density close to the limiting current density of methanol across the anode backing, the methanol crossover rate in the operating cell is minimized. By using a properly chosen anode backing, a fuel efficiency above 90% can be achieved in a direct methanol fuel cell using a Nafion® 117 membrane.

TABLE A

Anode backing effect on the fuel efficiency of a DMFC operated at 60° C. fed with 0.5M methanol solution at 150 mL/min at the anode.

| Anode backing | $J_{lim, backing}$ mA/cm$^2$ | Crossover Rate in DMFC at 150 mA/cm$^2$ | Fuel efficiency % |
|---|---|---|---|
| E-Tek NC/DS/V2 | 160 | 3 | 98 |
| Nafion coated E-Tek NC/DS/V2 | 215 | 18 | 89 |
| E-Tek 2.22 | 200 | 15 | 91 |
| E-Tek 2.02 | 240 | 24 | 86 |
| Open backing | 300 | 35 | 81 |

Table A describes selection of optimized backing for a DMFC operation point of 150 mA/cm$^2$ and a feed stream of 0.5M methanol. By gradual variations of anode backing thickness and/or porosity and hydrophilic/hydrophobic characteristics, limiting methanol flow rates through the backing could be tuned between 160 mA/cm$^2$, i.e., just 7% above the design current density of 150 mA/cm$^2$, and 300 mA/cm$^2$, i.e., twice the design current. The results of fuel efficiency measurements show (third column) that, at this design current density, fuel efficiency was highest (98%) with the anode backing sample designated E-TEK, NC/DS/V2, associated with a limiting methanol flow rate $J_{lim,b}$ of 160mA/cm$^2$. At $J_{cell}$=150 mA/cm$^2$, the methanol crossover rate across the cell (second column) was reduced to the very low level of 3 mA/cm$^2$.

Referring to Table B, working with a higher feed concentration of 1M methanol, backing type NC/DS/V2 is associated with $J_{lim,b}$ of 320 mA/cm$^2$ at the same temperature which, as expected, is twice the $J_{lim,b}$ measured with a 0.5M feed for the same backing layer. Consequently, at $J_{cell}$=150 A/cm$^2$, a significantly higher crossover flow rate of 58 mA/cm$^2$ is measured. This translates to fuel efficiency of just 72%. Even lower fuel efficiencies are obtained at $J_{cell}$=150 mA/cm$^2$ with a 1M methanol feed when using the same backing layers shown in Table A.

TABLE B

Anode backing effect on the fuel efficiency of a DMFC operated at 60° C. fed with 1.0M methanol solution at the anode.

| Anode backing | $J_{lim, backing}$ mA/cm$^2$ | Crossover Rate in DMFC At 150 mA/cm$^2$ | Fuel efficiency % |
|---|---|---|---|
| E-Tek NC/DS/V2 | 320 | 58 | 72 |
| Nafion coated E-Tek NC/DS/V2 | 430 | 79 | 66 |
| E-Tek 2.22 | 400 | 50 | 76 |
| Open backing | 600 | 98 | 60 |

Figure 9:
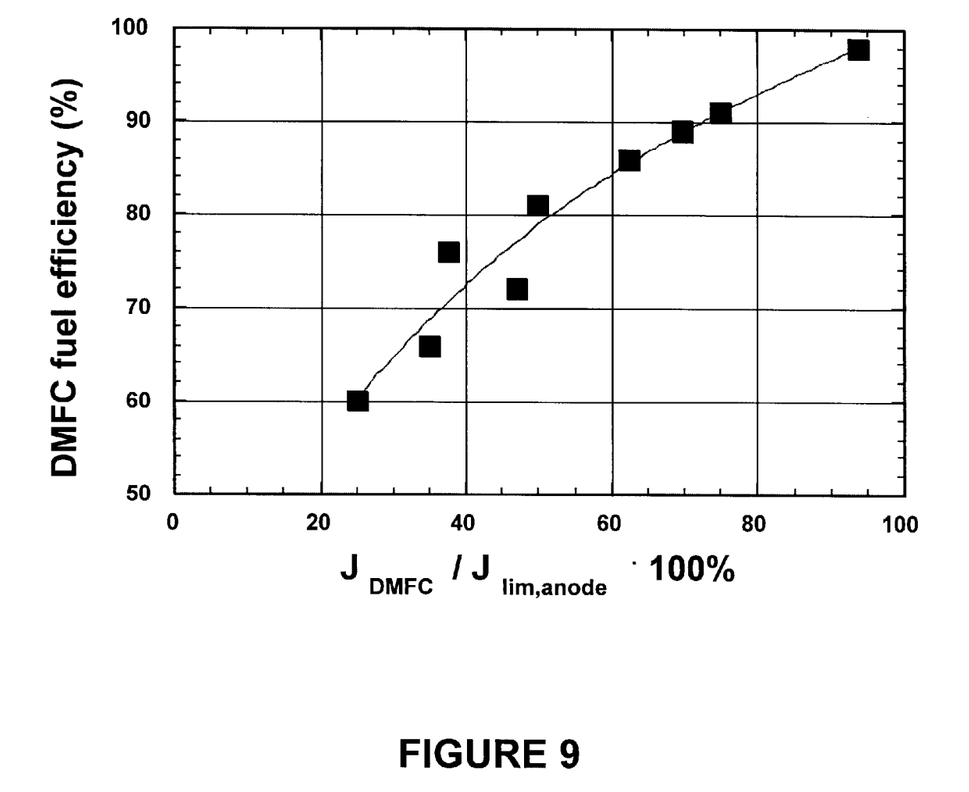
FIG. 9 graphically depicts fuel efficiency as a function of the ratio of the operating DMFC current density to the limiting current density of methanol across the anode backing.

According to the principle herein described for the selection of an anode backing to enhance methanol utilization, samples shown in Table B will provide high fuel efficiency with 1M methanol feed only if the design current is 300 mA/cm$^2$ and above, whereas less permeable (e.g., thicker) backing layers will be required to achieve high fuel efficiency at a cell current density of 150 mA/cm$^2$ with a 1M feed. The measured fuel efficiency as a function of the ratio of the DMFC operating current density to the limiting current density across the backing is summarized in FIG. 9, based on data from Tables A and B.

Figure 10:
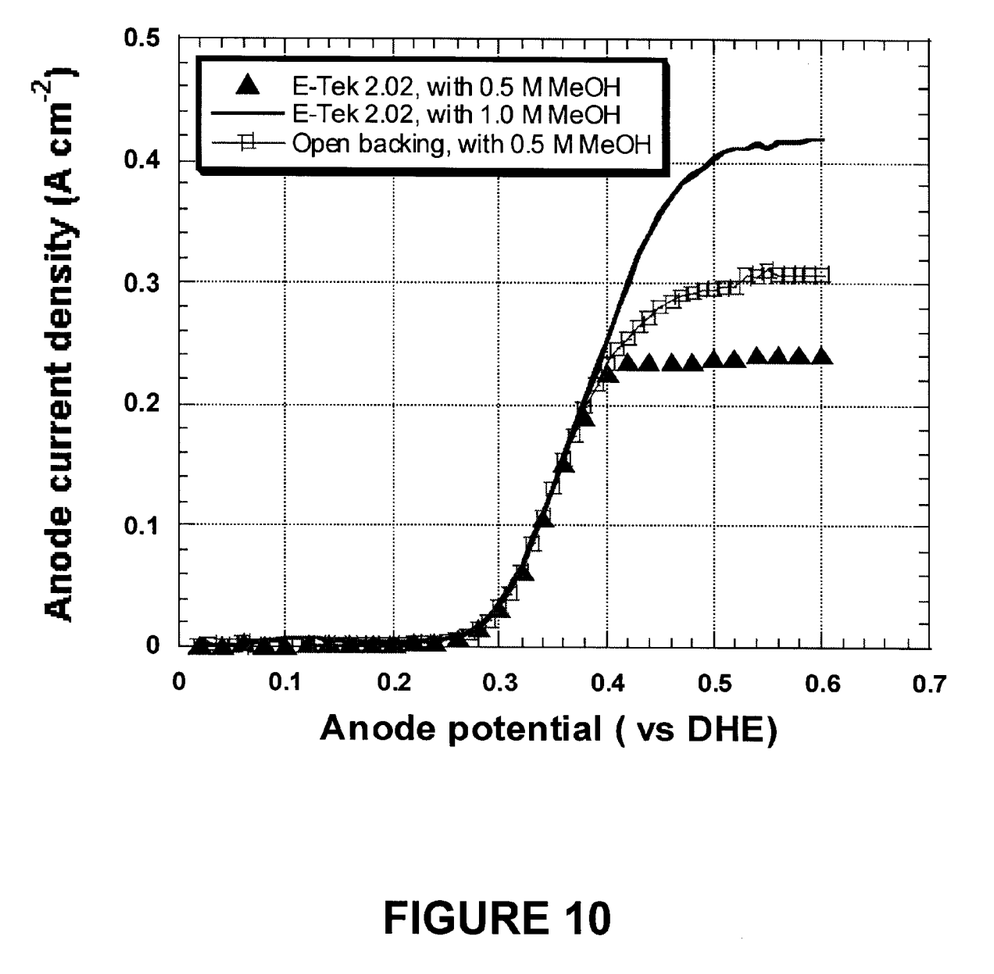
FIG. 10 graphically depicts the anode polarization of DMFCs with various anode backings and methanol concentration feeds.

FIG. 10 shows that the DMFC anode performance with two different anode backings and methanol concentration feeds are nearly identical at a current density up to about 200 mA cm$^{-2}$, despite quite different limiting current densities of methanol across the anode backings. This stresses the absence of any negative effect on cell performance from the introduction of an anode backing with limited methanol permeability. Improved fuel efficiency is, thus, achieved at no penalty in cell performance for $J_{cell}$ up to 0.8–0.9 $J_{lim,b}$.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fuel cell for use with a direct methanol fuel cell having a methanol feed at a fuel cell anode and an oxygen or air feed at a fuel cell cathode, the fuel cell comprising:

an anode distribution plate at the anode of the fuel cell configured to distribute methanol over an anodic membrane surface of the fuel cell; and a conductive sheet between the anode distribution plate and the membrane surface forming a mass transport barrier having a ratio of limiting methanol current density, $J_{lim,b}$, to fuel cell design current, $J_{cell}$, to a range of about 1.1 to 1.3.

2. A fuel cell according to claim 1, wherein the distribution plate is a perforated corrugated plate for distributing methanol vertically and laterally over the anodic membrane surface.

3. A fuel cell according to claim 1, further including a cathode distribution plate at the cathode of the fuel cell formed from a perforated corrugated plate for distributing oxygen or air and removing cathode reaction products vertically and laterally over a cathodic membrane surface.

4. A method for enhancing the utilization of methanol in a direct methanol fuel cell comprising the step of limiting the crossover of methanol through the fuel cell by selecting an anode backing for the fuel cell having a ratio of limiting methanol current density, $J_{lim,b}$, to fuel cell design current, $J_{cell}$, to a range of about 1.1 to 1.3.

5. A method according to claim 4, further including the step of providing for both vertical and lateral flow of methanol for uniform distribution of methanol over a fuel cell anodic membrane surface.

6. A method according to claim 5, further including the step of providing a perforated corrugated sheet to permit both vertical and lateral flow of methanol.

7. A method according to claim 4, further including the step of providing for both vertical and lateral flow distribution of oxygen or air for uniform distribution over a fuel cell cathodic membrane surface and removal of cathode reaction products.

8. A method according to claim 7, further including the step of providing a perforated corrugated sheet to permit both vertical and lateral flow of oxygen or air and removal of cathode reaction products.

* * * * *